United States Patent
Ogawa

(10) Patent No.: US 6,851,596 B2
(45) Date of Patent: Feb. 8, 2005

(54) WAVE SOLDERING APPARATUS

(75) Inventor: Tadamichi Ogawa, Tokyo (JP)

(73) Assignee: Senju Metal Industry Co., Ltd., Tokyo (JP)

(*) Notice: Subject to any disclaimer, the term of this patent is extended or adjusted under 35 U.S.C. 154(b) by 65 days.

(21) Appl. No.: 10/456,581

(22) Filed: Jun. 9, 2003

(65) Prior Publication Data

US 2004/0211816 A1 Oct. 28, 2004

(30) Foreign Application Priority Data

Jun. 11, 2002 (JP) ........................................ 2002-169612

(51) Int. Cl.[7] .............................................. B23K 37/00
(52) U.S. Cl. ........................................ 228/37; 228/260
(58) Field of Search ................................ 228/256–262, 228/33–40, 56.1

(56) References Cited

U.S. PATENT DOCUMENTS

| | | | | |
|---|---|---|---|---|
| 4,954,072 A | * | 9/1990 | Zimmerman | ................. 425/549 |
| 5,121,869 A | * | 6/1992 | Knudsen et al. | .............. 228/4.1 |
| 5,156,317 A | * | 10/1992 | Zabala et al. | ................. 228/4.1 |
| 5,176,312 A | * | 1/1993 | Lowenthal | ................ 228/180.1 |
| 5,747,102 A | * | 5/1998 | Smith et al. | ................ 427/98.4 |
| 6,499,645 B2 | * | 12/2002 | Arakane | ......................... 228/36 |
| 6,527,158 B1 | * | 3/2003 | Brouillette et al. | ............ 228/33 |
| 6,780,340 B2 | * | 8/2004 | Conta | ............................ 216/27 |
| 2003/0131475 A1 | * | 7/2003 | Conta | ......................... 29/890.1 |
| 2003/0230822 A1 | * | 12/2003 | Bartholomew | .............. 264/156 |

FOREIGN PATENT DOCUMENTS

| | | | |
|---|---|---|---|
| JP | 61-82966 | | 4/1986 |
| JP | 04071777 A | * | 3/1992 |
| JP | 11-47918 | | 2/1999 |

* cited by examiner

*Primary Examiner*—Kiley S. Stoner
(74) *Attorney, Agent, or Firm*—Wenderoth, Lind & Ponack, L.L.P.

(57) ABSTRACT

A wave soldering apparatus includes a solder reservoir within which a pool of molten solder is held at a suitable temperature by heaters. Each heater has an electric heating element and a cover mounted to the solder reservoir to protect the heating element from the molten solder. A solder wave nozzle is submerged in the pool of molten solder and includes a nozzle housing within which a baffle is mounted, and a nozzle head mounted to the nozzle housing and having nozzle openings. An impeller pump includes an impeller housing communicated with the nozzle housing and an impeller connected to a motor. The impeller is driven to draw the molten solder into the impeller, pump the molten solder up through the nozzle housing and force the molten solder through the nozzle opening to form a solder wave through which a printed circuit board to be solder passes. The nozzle housing, the baffle, the nozzle head, the heater cover, the impeller housing, and the impeller are all made of stainless steel and surface-treated with nitrogen.

5 Claims, 2 Drawing Sheets

WAVE SOLDERING APPARATUS

BACKGROUND OF THE INVENTION

The present invention relates to wave soldering apparatus and more particularly, to an durable solder reservoir and a nozzle/pump assembly which withstand high temperatures and which are less subject to wear due to rubbing contact with solder within the solder reservoir.

A usual wave soldering apparatus includes conveyors driven to advance printed circuit boards at a constant speed from the entrance to exit ends of the apparatus. The board is first carried to a fluxer where flux is applied to the underside of the board. The printed circuit board is then carried over preheaters where the temperature of the board is elevated to approximately 110° C. to 130° C. so as to evaporate excess flux solvent, activate the flux and minimize thermal shock to the printed circuit board. After the printed circuit board is brought to such a preheat temperature, the board passes over a solder reservoir. A plurality of electric heaters are arranged within the solder reservoir to maintain solder in a molten state. At least one solder wave nozzle is disposed in the solder reservoir and connected to a pump. The pump forces the molten solder up through the nozzle to form a solder wave. Electronic components in the board are contacted with the solder wave to make solder joints.

Typically, the heaters, the nozzle and the pump are made of stainless steel and each covered with a chromium oxide layer. The chromium oxide layer effectively retards adherence of the solder to the heaters, the nozzle and the pump. However, the chromium oxide layer is likely to be removed from the heaters since they are exposed to high temperatures. Also, the chromium oxide layer is likely to be removed from part of the nozzle and the pump due to rubbing contact with the solder. In the latter case, the molten solder acts as an abrasive. If the chromium oxide layer is damaged or removed, iron and nickel contained in the stainless steel become alloyed with tin contained in the solder. The resulting alloys melt into the molten solder within the solder reservoir. This results in damage to the heaters, the nozzle and the pump.

Japanese laid-open patent publication No. 61-82966 discloses that a solder wave nozzle is coated with Teflon. However, such a Teflon coating is easily damaged or removed at high temperatures. Also, impingement of solder against the nozzle accelerates removal of the Teflon coating from the nozzle. Japanese laid-open patent publication No. 11-47918 teaches the use of a compound of sulfide and nitride. Such a compound effectively prevents adherence of solder to a solder reservoir, but it is rather expensive and cumbersome to form the compound on the surface of the solder reservoir.

Accordingly, it is an object of the present invention to provide a wave soldering apparatus which effectively and economically prevents adherence of solder to heaters, nozzles and other members of the apparatus regardless of whether they are exposed to high temperatures or subjected to rubbing contact with the solder.

SUMMARY OF THE INVENTION

In order to achieve the foregoing object, the present invention provides a wave soldering apparatus which comprises a solder reservoir within which a pool of molten solder is held at a preset suitable temperature by one or more heaters. Each of the heaters includes an electric heating element and a heater cover mounted within the solder reservoir so as to enclose and protect the heating element. The heaters may alternatively be mounted outside of the solder reservoir. The heater cover is made of stainless steel and covered with a chromium oxide layer. The heater cover is heated to over 300° C. when the heating element is activated. To protect the chromium oxide layer against such high temperatures, the heater cover is surface-treated with nitrogen to thereby form a nitride layer.

One or more solder wave nozzles are disposed within the solder reservoir. Each of the solder wave nozzles includes a nozzle housing submerged in the pool of molten solder, a baffle or perforated plate mounted within the nozzle housing, and a nozzle head mounted to the upper end of the nozzle housing and including a plurality of nozzle openings. The nozzle housing, the baffle and the nozzle head are all made of stainless steel and each covered with a chromium oxide layer. The corresponding number of pumps are operatively connected to the solder wave nozzles. Each of the pumps includes an impeller housing communicated with the nozzle housing of the solder wave nozzle, and an impeller disposed within the impeller housing and drivingly connected to an impeller motor. The impeller is driven to draw the molten solder into the impeller housing and then, the nozzle housing and force the molten solder upwardly through the nozzle openings to form a solder wave. The impeller housing and the impeller are made of stainless steel and each covered with a chromium oxide layer. The nozzle housing, the baffle, the nozzle head, the impeller housing and the impeller are all subjected to rubbing contact with the solder. Such rubbing contact could remove the chromium oxide layer from these members during operation of the apparatus. To this end, the nozzle housing, the baffle, the nozzle head, the impeller housing and the impeller are surface-treated with nitrogen to thereby form a nitride layer, as in the heaters.

BRIEF DESCRIPTION OF THE DRAWINGS

A better understanding of the present invention may be had by reference to the following detailed description when taken in conjunction with the accompanying drawings; in which.

DETAILED DESCRIPTION OF THE INVENTION

Figure 1:
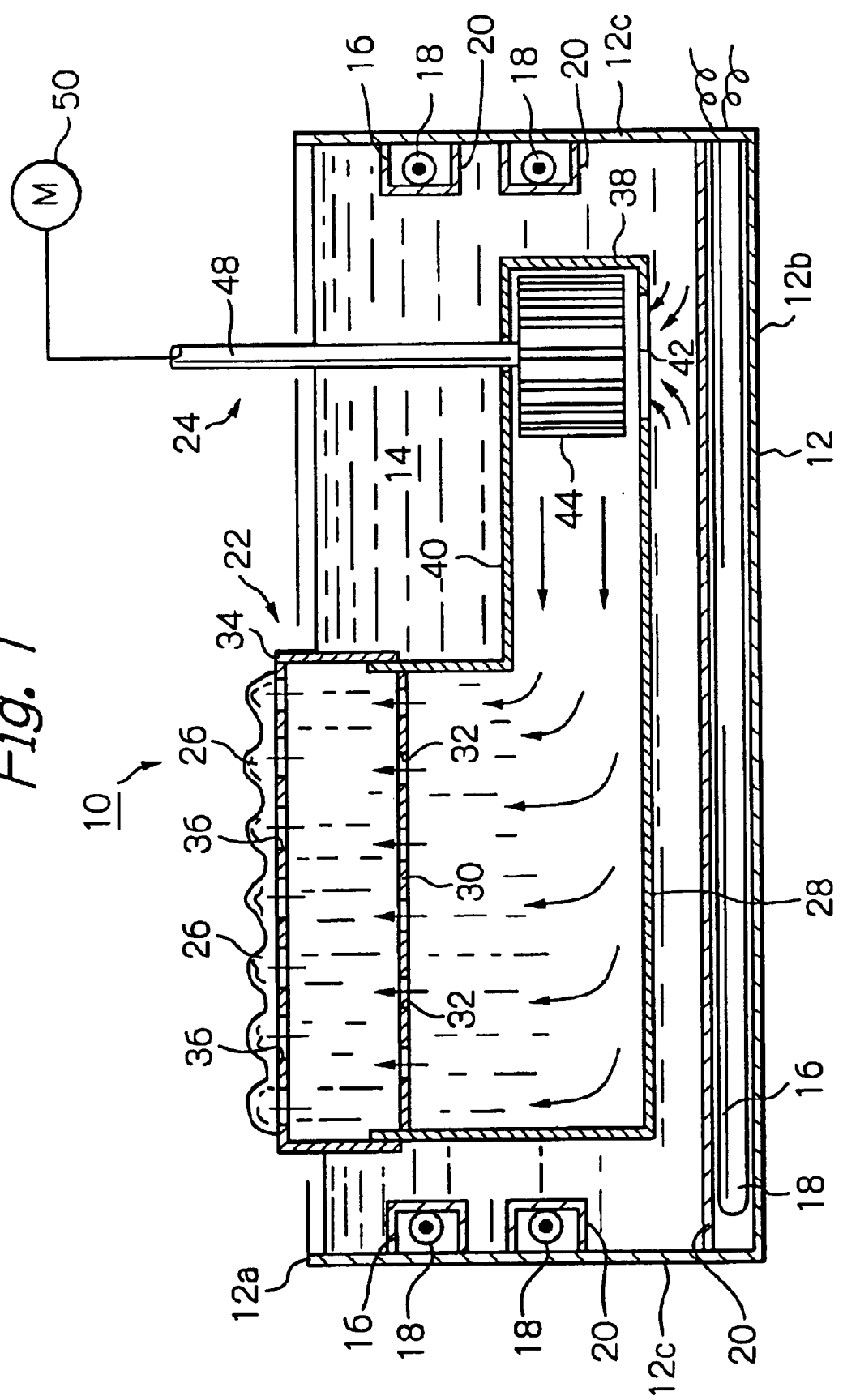
FIG. 1 is a side view, partly in section, of a wave soldering apparatus according to one embodiment of the present invention.
Figure 2:
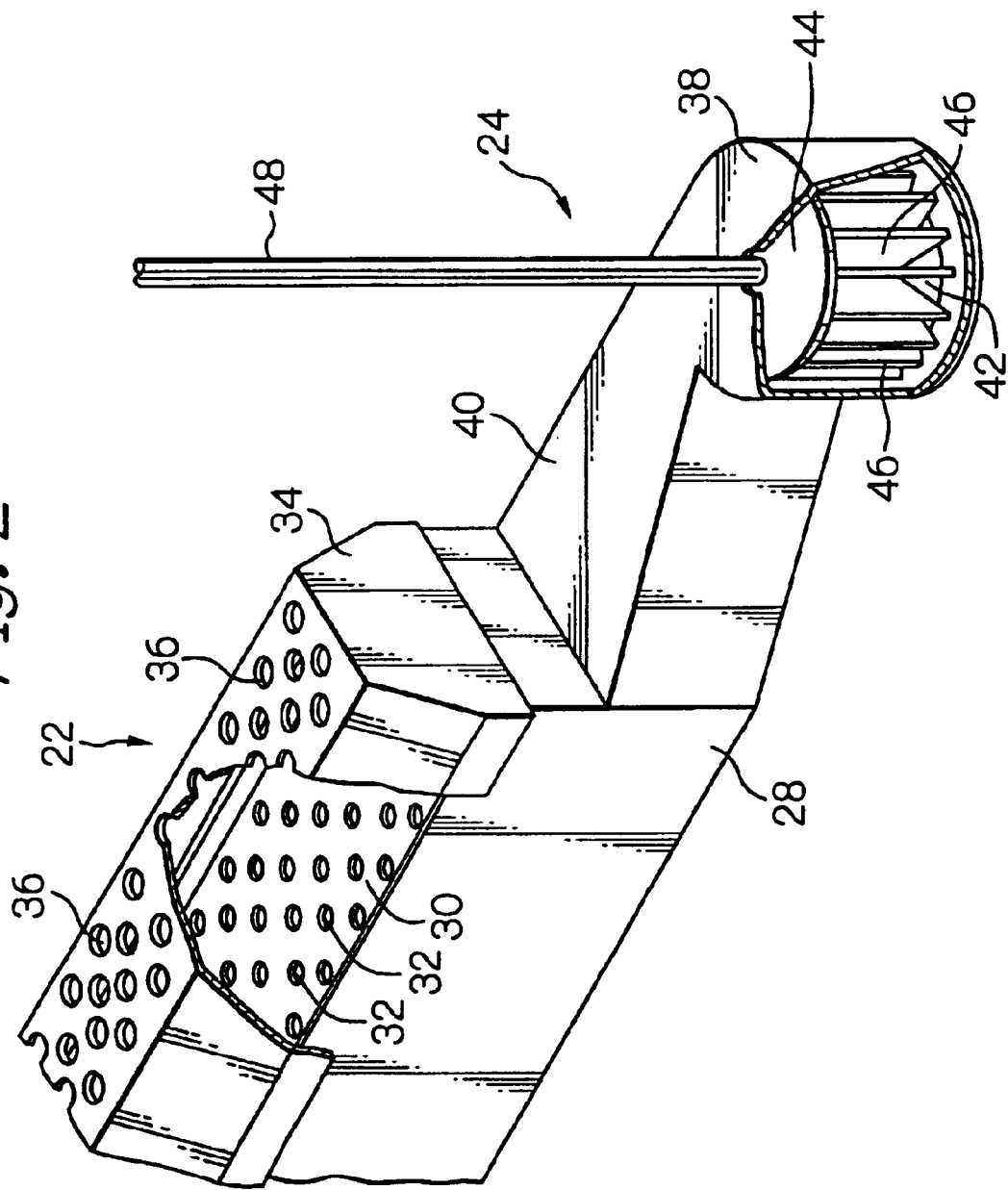
FIG. 2 is a perspective view, on a slightly enlarged scale, of a solder wave nozzle and pump assembly with part broken away to show the interior of a nozzle housing and an impeller housing.

Referring to FIGS. 1 and 2, there is illustrated a wave soldering apparatus according to one embodiment of the present invention and generally designated by reference numeral 10. The wave soldering apparatus 10 includes a solder reservoir 12 made of stainless steel. The solder reservoir 12 is in the form of a rectangular box and has an open top 12a, a closed bottom 12b and four side walls 12c (only two walls are shown in FIG. 1). The solder reservoir 12 is filled with molten solder 14 which is held at a preset suitable temperature by a plurality of electric heaters 16. The electric heaters 16 are mounted to the bottom 12b and side walls 12c of the solder reservoir 12 and each include an elongated heating element 18 and a cover 20. The covers 20, made of stainless steel, are secured to the bottom 12b and side walls 12c of the solder reservoir 12 to enclose and protect the respective heating elements 18.

A solder wave nozzle 22 and a pump 24 are operatively associated with each other to establish a solder wave 26 over or through which a printed circuit board (not shown) to be soldered is conveyed. The solder wave nozzle 22 includes a rectangular nozzle housing 28 submerged in the pool of molten solder. A perforated plate or baffle 30 is secured to near the open top of the nozzle housing 28 and includes a plurality of baffle openings 32. A nozzle head 34 is fit over the open top of the nozzle housing 28 and formed at its top with a plurality of nozzle openings 36. The nozzle housing 28, the baffle 30 and the nozzle head 34 are all made of stainless steel.

The pump 24 is of the impeller type and includes a generally circular impeller housing 38 communicated with the nozzle housing 28 through a horizontal duct 40. The impeller housing 38 is formed at its bottom with an inlet 42 through which the molten solder enters. An impeller 44 is rotatably received within the impeller housing 38 and has a plurality of vanes 46. A vertical shaft 48 has a lower end secured to the impeller 44 and an upper end drivingly connected to an external motor 50 through a belt-and-pulley assembly (not shown). The impeller housing 38, the impeller 44 and the duct 40 are all made of stainless steel.

In use, the electric heaters 16 are activated to heat the solder 14 within the solder reservoir 12 to the desired temperature or viscosity. The impeller motor 50 is then energized to rotate the shaft 48 and thus, the impeller 44. This draws the molten solder into the interior of the impeller housing 38 through the inlet 42. The molten solder thus drawn is pumped first horizontally along the duct 40 and then vertically along the nozzle housing 28. The molten solder is caused to flow in a turbulent fashion in the bottom of the nozzle housing 28 due to the continued pumping action of the impeller 44 and changes in the path of flow of the molten solder. The baffle openings 32 are so arranged that the molten solder can have a substantially vertical path above the baffle. As such, a substantially laminar flow solder wave is produced when the molten solder is pumped out through the nozzle openings 36 of the nozzle head 34. This solder wave has a uniform height or profile to ensure full contact of the molten solder with a printed circuit board.

According to the present invention, the heater covers 20, the nozzle housing 28, the baffle 30, the nozzle head 34, the impeller housing 38, the impeller 44 and the duct 40 are all surface-treated with nitrogen. As a result, a nitride layer is formed on each of these members. This surface treatment enables the heater covers 20, the nozzle housing 28, the baffle 30, the nozzle head 34, the impeller housing 38, the impeller 44 and the duct 40 to withstand high temperatures and effectively prevents the chromium oxide layer from being removed from these members due to rubbing contact and impingement with the solder.

Although the present invention has been described with reference to its preferred embodiment, it is to be understood that a variety of changes and modifications may be made without departing from the scope of the invention as defined by the appended claims.

What is claimed is:

1. A wave soldering apparatus comprising:

a solder reservoir for holding a pool of molten solder;

at least one heater operatively associated with said solder reservoir to maintain the molten solder at a preset temperature, said at least one heater including a heating element and a cover made of stainless steel and disposed to enclose said heating element;

at least one solder wave nozzle at least partly submerged in the pool of molten solder and made of stainless steel, said at least one solder wave nozzle including a plurality of nozzle openings; and at least one pump operatively connected to said at least one solder wave nozzle and at least partly made of stainless steel, said at least one pump being operable to draw the molten solder into said at least one nozzle and force the molten solder upwardly through said plurality of nozzle openings to form a solder wave, said at least one solder wave nozzle and part of said at least one pump being surface-treated with nitrogen.

2. A wave soldering apparatus according to claim 1, wherein said at least one heater is mounted within said solder reservoir, and said cover is surface-treated with nitrogen.

3. A wave soldering apparatus according to claim 1, wherein said at least one solder wave nozzle includes a nozzle housing having an open top, a closed bottom and side walls, a baffle mounted within said nozzle housing, and a nozzle head mounted to the open top of said nozzle housing, said plurality of nozzle openings being defined in said nozzle head, said nozzle housing, said baffle and said nozzle head being surface-treated with nitrogen.

4. A wave soldering apparatus according to claim 3, wherein said at least one pump includes an impeller housing communicated with said nozzle housing of said at least one solder wave nozzle and having an inlet, an impeller disposed within said impeller housing, and a motor operatively connected to said impeller to rotate said impeller to thereby draw the molten solder into said impeller housing through said inlet, said impeller housing and said impeller being surface-treated with nitrogen.

5. A wave soldering apparatus according to claim 4, further comprising a duct made of stainless steel and connected between said impeller housing and said nozzle housing, said duct being surface-treated with nitrogen.

* * * * *